(No Model.)
F. J. BLANKE.
SPRING DRAFT DEVICE.
No. 493,240. Patented Mar. 14, 1893.
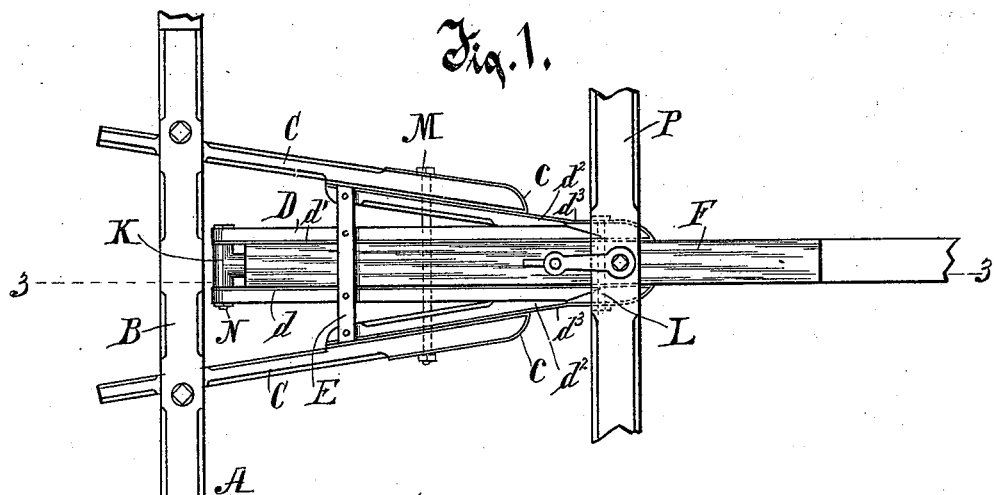
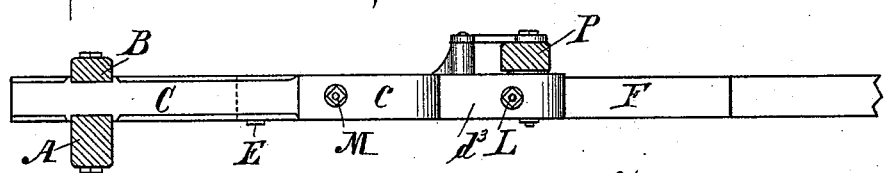
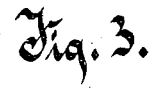
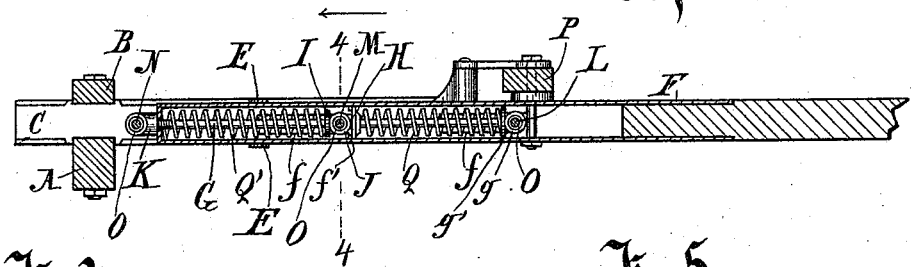
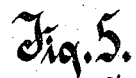
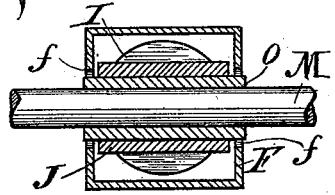
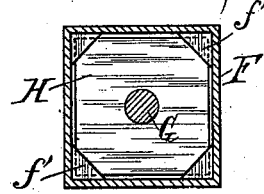
Witnesses.
O. H. Keeney,
Anna V. Faust
Inventor.
Ferdinand J. Blanke,
By Benedict & Morsell,
Attorneys.
THE NORRIS PETERS CO., PHOTO-LITHO., WASHINGTON, D. C.

UNITED STATES PATENT OFFICE.

FERDINAND J. BLANKE, OF COLD SPRING, WISCONSIN.

SPRING-DRAFT DEVICE.

SPECIFICATION forming part of Letters Patent No. 493,240, dated March 14, 1893.

Application filed May 23, 1892. Serial No. 433,995. (No model.)

*To all whom it may concern:*

Be it known that I, FERDINAND J. BLANKE, of Cold Spring, in the county of Jefferson and State of Wisconsin, have invented a new and useful Improvement in Spring Vehicle-Poles, of which the following is a description, reference being had to the accompanying drawings, which are a part of this specification.

My invention has relation to improvements in spring vehicle poles, designed to be used in connection with any form of vehicle to which a team is attached.

The invention also has particular relation to improvements upon the device covered by Letters Patent issued to me under date of January 19, 1892, and numbered 467,223, wherein the pole or thill is stationary, and the whiffletree attachment alone movable.

The present invention, however, differs from that particularly in providing a device wherein both the pole and the attachment are movable, as will hereinafter more fully appear.

The object had in view is to relieve the shock or strain on the team or animal occurring on starting, or when the machine, in being hauled, strikes an obstruction temporarily impeding its forward motion.

In the accompanying drawings, Figure 1, is a plan view. Fig. 2, is a side elevation with the forward axle and whiffletree in section. Fig. 3, is a longitudinal vertical section on the line 3—3 Fig. 1. Fig. 4, is a transverse section on the line 4—4 Fig. 3, looking in the direction of the arrow, and Fig. 5, is a similar view on the same line, but looking in the opposite direction.

Like letters of reference designate like parts throughout the several views.

Referring to the drawings, the letter A indicates the fore-axle and B, the bar above the same, which receive therebetween the rear ends of hounds C C, extending forwardly, and inwardly in the usual manner. The front ends of these hounds upon opposite sides are provided with metallic surfaces $c$, to prevent wear thereon.

A connecting frame D is interposed between the front ends of the hounds, the inner portion of said frame consisting of parallel bars $d\ d$, having their inner sides faced with metallic strips $d'\ d'$, and the outer portion of this frame consisting of rearwardly and outwardly extending pieces $d^2\ d^2$ corresponding to the ordinary tongue-hounds also metallically faced as indicated at $d^3$, said metallic faces contacting with the similar faces of the hounds C. The rear ends of the outer portions $d^2$ are connected by transverse braces E E which, together with the inner strips D D form a guide-way for the tongue casing. This casing consists of a rectangular box F having its rear closed end centrally apertured, and its forward open end adapted to receive the tongue or pole of the vehicle therein. Upon opposite sides of the casing are arranged registering elongated slots $f, f$, and interiorily said casing is provided at the angles thereof, and medially of its length, with projecting shoulders $f'$.

Within the casing is arranged longitudinally a rod, G, said rod provided at its forward end with a tubular portion or T-head, $g$, which is also provided immediately to the rear of the tube with an annular plate or disk $g'$.

At or about the center of the rod are provided two plates, one of which H is preferably rectangular in form, and the other I, preferably annular in form. Between these two plates is interposed a tubular portion J.

Upon the rear end of the rod is screwed a T-shaped casting K, similar to the part $g$, upon the forward end, the head thereof also being tubular. The tubular parts $g$ and J register with the elongated slots $f, f$, of the casing, the former receiving a transverse bolt L, said bolt also passing through the forward elongated slots and through the frame D, and the latter receiving a central bolt M, passing through the rear elongated slots and through the frame D, forming a central pivot bolt upon which said frame may turn. In inserting rod G in place, T-head K, upon the rear end thereof is removed, in order to permit said end to pass through the aperture in the rear end of the casing or box. After the rod is thus arranged, the T-head is screwed on to the rear projecting end thereof so as to abut against the end of the box or casing, and to bring the tubular portion into alignment with apertures or eyes formed in the rear ends of the medial straight bars $d, d$, of the frame, a bolt N passing therethrough and through the tubular part.

I prefer to provide the several tubular parts referred to with removable interior collars O, through which the bolts pass, said collars projecting out laterally slightly beyond the tubes as indicated clearly in Fig. 4, so as to contact with the inner faces of the medial parallel bars $d, d$, in order to keep the casing properly spaced.

When the rod is inserted in place in the manner just described, and the rear end passed through the aperture in the closed end of the box or casing, and the T-head K, adjusted in place, care should also be taken that the other tubular portions are brought into alignment with the apertures of the several bars of the connecting frame, D, so that the transverse bolts may be readily inserted in place.

Upon the top of the box or casing is pivoted a whiffletree P. Surrounding rod G, are shown two coiled springs Q Q', the former located between the disk or plate $g'$ and the rectangular plate H, and the latter between plate, I, and the end of the box or casing.

It is obvious that as the T-head K, is screwed on to the rear end of rod G, inasmuch as said T-head abuts against the end of the casing, rod G, when the head is turned in one direction, will be forced outward, and when turned in the opposite direction will be forced farther inward, so that in this manner the tension of the spring Q' may be adjusted.

While I have shown and described the employment of two springs, it is obvious that one only may be employed, and successful results obtained. When this is the case, however, no necessity exists for employing the medial tubular portion J, and the plates upon the opposite sides thereof. When one spring is used, however, in order to withstand the strain, it is necessary to make the same quite heavy, which interferes with its elasticity.

It is for this reason that I prefer to provide two springs, as shown in the drawings, whereby they may be made comparatively light, and thus the greatest amount of elasticity attained.

The function of the interior shoulders, $f'$, is to serve as stops for the rectangular plate H, the two contacting as clearly shown in Fig. 3.

It will be readily seen that all the strain occasioned by hauling the vehicle is exerted on the springs, the tension thereof being sufficient to resist the strain of hauling under ordinary circumstances. In cases where the strain is above the normal, and the team is pulling with considerable force, the casing or box is carried forwardly, the frame D holding the rod G, against lengthwise movement, and thus causing the forward strain to be exerted against the springs, which of course are compressed by the movement of the box or casing.

While I have shown my improvement as employed in connection with that class of vehicles in which the hounds extend from the fore-axle, it is obvious that the utility of the device is not confined to this particlar adaptation, as it may be used in connection with almost any style of vehicle, including sulky-plows, and analogous agricultural machines, the only requisite being that such vehicles possess means at their forward ends for securing my attachment in place, in substantially the manner pointed out in the specification.

Having thus described my invention, what I claim, and desire to secure by Letters Patent of the United States, is—

1. In a spring pole for vehicles, the combination, of a frame, a casing longitudinally movable therein, provided upon opposite sides with elongated slots, a spring encircled rod within the casing, the rear end thereof passing through the rear closed end of said casing, tubular portions upon opposite ends of the rod, bolts passing through said tubular portions, the bolt at the forward end also passing through the elongated slots of the casing and entering the frame, and the bolt at the rear end passing into eyes at the corresponding end of the frame, and a whiffletree pivoted to the box or casing, substantially as set forth.

2. In a spring pole for vehicles, the combination, of a frame, a tongue box or casing between the side pieces of the frame, and provided upon opposite sides with elongated slots, transverse strips connecting the upper and lower edges of the side pieces of the frame and forming a guide-way for the box or casing, a spring encircled rod within the casing, the rear end thereof passing through the rear closed end of said casing, tubular portions upon opposite ends of the rod, bolts passing through said tubular portions, the bolt at the forward end also passing through the elongated slots and entering the frame, and the bolt at the rear end passing into eyes at the corresponding end of the frame, and a whiffletree pivoted to the box or casing, substantially as set forth.

3. In a spring pole for vehicles, the combination, of a medially and horizontally pivoted frame, a casing turning upon the pivot of the frame and longitudinally movable in the frame, and a spring against which the casing acts when said casing is drawn forward by the attached team, substantially as set forth.

4. In a spring pole for vehicles, the combination of a frame, a tongue box or casing interposed between the frame, and provided upon opposite sides with elongated slots, a spring encircled rod within the casing, the rear end thereof passing through the rear closed end of said casing, tubular portions upon opposite ends of the rod, collars or sleeves within the tubular portions extending laterally therefrom to contact with the sides of the frame, bolts passing through these collars or sleeves, the front bolt also passing through the elongated slots and entering the frame, and the ends of the rear bolt entering eyes at the corresponding end of the frame, and a whiffletree pivoted to the box or casing, substantially as set forth.

5. In a spring pole for vehicles, the combination, of a frame, a tongue box or casing interposed between the frame and provided upon opposite sides with elongated slots, a spring encircled rod within the casing, the rear end thereof passing through the rear closed end of said casing, a tubular portion upon the forward end of the rod within the casing, a similar tube adjustable upon the rear end of the rod exterior of the casing, and bolts passing through said tubular portions, the bolt at the forward end passing through the elongated slots of the casing and entering the frame, and the bolt at the rear end also passing into eyes in the frame, and a whiffletree pivoted to the box or casing, substantially as set forth.

6. In a spring pole for vehicles, the combination, of axle hounds, a frame therebetween, a tongue box or casing interposed between the side pieces of the frame, and provided upon opposite sides with elongated slots, a rod within the casing having its rear end passing through the rear closed end of the casing, and provided at opposite ends with tubular portions, and medially with plates having a tube interposed therebetween, a spring interposed between the forward tubular portion and one of the medial plates, a second spring interposed between the other plate and the rear closed end of the box, a bolt passing through the tubular portion at the forward end of the rod, through the elongated slots at that point, and having its ends entering the frame, a bolt passing through the tubular portion upon the rear end of the rod exterior of the casing and having its ends entering the frame, a central pivot bolt passing through the medial tubular portion, through the elongated slots corresponding thereto and having its ends passing through the frame and hounds, and a whiffletree pivoted to the box or casing, substantially as set forth.

In testimony whereof I affix my signature in presence of two witnesses.

FERDINAND J. BLANKE.

Witnesses:
ARTHUR L. MORSELL,
JOHN KNOBBE.